Sept. 26, 1950

R. H. GODDARD

COMBUSTION APPARATUS COMPRISING SUCCESSIVE COMBUSTION CHAMBERS

Filed Nov. 1, 1947

2,523,656

INVENTOR.
Robert H. Goddard, Dec'd
Esther C. Goddard, Executrix
BY Chas. T. Hawley
ATTORNEY Patented Sept. 26, 1950

2,523,656

UNITED STATES PATENT OFFICE 2,523,656

COMBUSTION APPARATUS COMPRISING SUCCESSIVE COMBUSTION CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application November 1, 1947, Serial No. 783,594

1 Claim. (Cl. 60—35.6)

This invention relates to combustion apparatus including a combustion chamber having a rearwardly open discharge nozzle and adapted for use in the propulsion of rockets or rocket craft.

It is the general object of the invention to attain more complete combustion in such apparatus by providing two successive combustion chambers, with partial combustion taking place in the first and smaller chamber, and with final combustion effectively completed in the main and larger chamber.

Other features of the invention relate to special cooling devices and to means for breaking up direct axial flow through the main combustion chamber.

The invention further relates to arrangements and combinations of parts which will be hereinafter described and more particularly pointed out in the appended claim.

Preferred forms of the invention are shown in the drawing, in which

Figure 1:
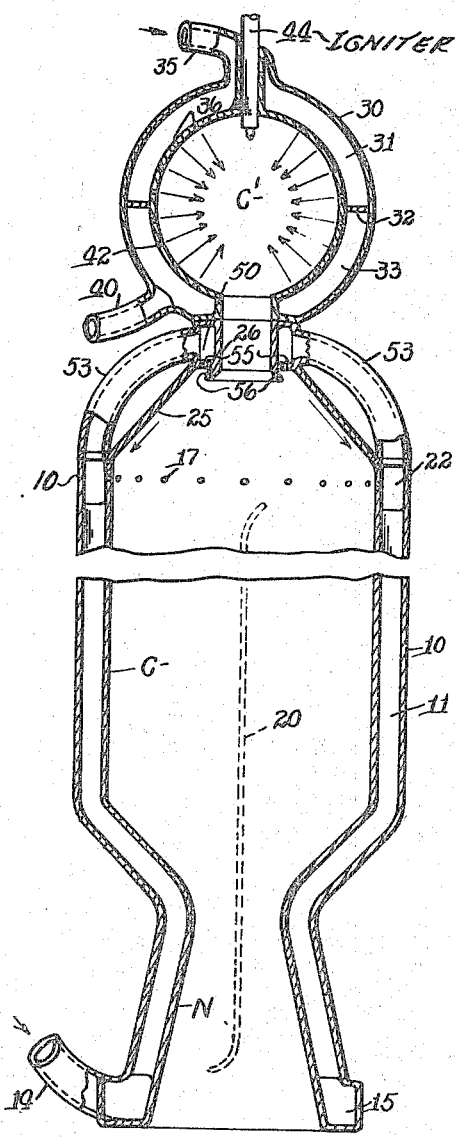
Fig. 1 is a sectional side elevation of combustion apparatus embodying this invention.

Referring to Fig. 1, this improved combustion apparatus comprises a main combustion chamber C having a rearwardly open discharge nozzle N and having an outer casing 10 enclosing a jacket space 11 surrounding both the chamber and nozzle.

Cooling water is supplied under pressure through a pipe 14 to a manifold 15 at the outer end of the nozzle N, and this water flows upward through the space 11 and is discharged through spaced openings 17 near the upper end of the chamber C.

Vanes or partitions 20 are provided in the space 11 to maintain the chamber C and outer wall 10 in fixed spaced relation. These vanes also change the direction of flow of the water near the manifold 15 from circumferential to axial and change the direction of flow in the upper end portion 22 of the jacket space 11 from axial to tangential.

The upper end portion 25 of the chamber C is preferably conical and communicates through a tubular connecting member 26 with a smaller preliminary combustion chamber C'. This chamber C' is preferably of spherical shape and is surrounded by an outer casing 30 which provides a jacket space 31 above a partition 32 and a jacket space 33 below the partition 32.

Liquid fuel, as gasoline, may be supplied under pressure through a pipe 35 to the upper jacket space 31, from which it is sprayed through openings 36 into the preliminary combustion chamber C'.

Liquid oxygen may be similarly supplied under pressure through a pipe 40 to the jacket space 33, and may be sprayed into the chamber C' through a plurality of spray openings 42. Any suitable ignition device 44 may be provided for initiating combustion in the chamber C'.

Initial combustion takes place in the chamber C', and the combustion gases, together with any unconsumed combustion liquids, are then discharged through the tubular connecting member 26 into the main combustion chamber C. The combustion process is continued in the chamber C and is effectively completed before the combustion gases are discharged through the nozzle N.

In order to cool the connecting member 26 and the conical upper end portion 25 of the combustion chamber C, the member 26 is surrounded by a manifold 50 provided with port openings 55 and connected by pipes 53 with the upper end portion 22 of the jacket space 11. Water under pressure is thus provided for the manifold 50, and this water is discharged through the openings 55 against a spreader 56, by which the water is directed downward and outward to form a protective film inside of the chamber end portion 25.

All parts of the combustion apparatus are thus effectively cooled, either by the combustion liquids themselves or by a separate water supply.

Figure 2:
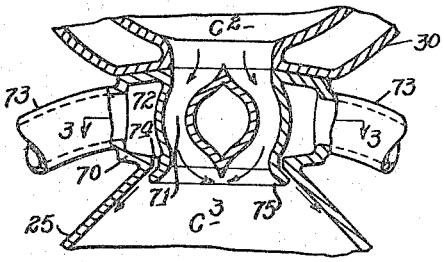
Fig. 2 is an enlarged partial sectional side elevation showing a modified construction.
Figure 3:
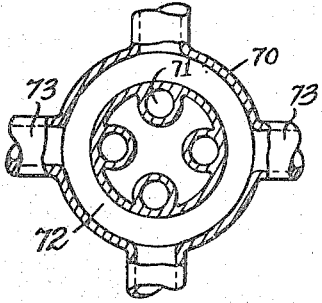
Fig. 3 is a partial sectional plan view, taken along the line 3—3 in Fig. 2.

In Figs. 2 and 3, a construction is shown which is designed to retard or break-up direct axial flow of the combustion gases through the combustion chamber C3 to the nozzle N. For this purpose, a connecting member 70 is provided with a plurality of curved passages 71 through which the combustion gases flow from the preliminary chamber C2 and enter main chamber C3 along converging and intersecting paths. Direct axial flow of the gases is thus substantially prevented, and the gases are more effectively intermingled for complete combustion in the main chamber C3.

The connecting member 70 has an annular cooling passage 72 receiving cooling water through pipes 73 and discharging the water through openings 74 against an annular spreader 75, all as previously described.

Figure 4:
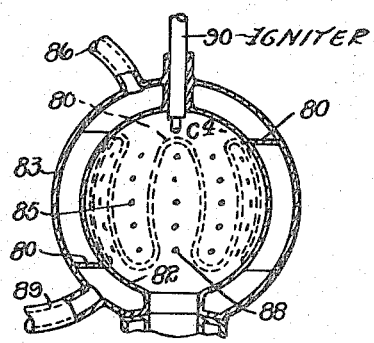
Fig. 4 is a sectional side elevation corresponding to the upper portion of Fig. 1 but showing a further modification.

In the construction shown in Fig. 4, more complete mixing and intermingling of the combustion liquids in the preliminary combustion chamber C4 is attained by providing a sinuous partition 80 between the chamber wall 82 and the outer casing 83. The spray openings 85 for the liquid oxygen supplied through the pipe 86 thus alternate circumferentially with the spray openings 88 for the gasoline supplied through the pipe 89. Any suitable ignition device 90 is provided for the chamber C4.

Except for the provision of the sinuous partition 80, the construction and operation is the same as previously described with reference to Fig. 1.

This invention is found most useful where both combustion elements are liquids and where at least one of the liquids, as liquid oxygen, is at a very low temperature. Complete vaporization and combustion of two such liquids when one of them is at an extremely low temperature has been found extremely difficult. With the construction herein shown, however, the jets of both liquids are directed to a common focus in the first and substantially spherical preliminary combustion chamber and substantial portions of the combustion liquids are then carried along through the connecting passage in close association with the combustion gases and are vaporized and made available for further and complete combustion on entering the main combustion chamber. Complete intermingling of the combustion elements is further facilitated by the fact that the combustion elements and gases traversing the curved passages 71 are discharged in converging directions, as indicated by the arrows in Fig. 2.

Having thus described the invention and the advantages thereof, it will be understood that the invention is not to be limited to the details herein disclosed, otherwise than as set forth in the claim, but what is claimed is:

In combustion apparatus having a first and smaller preliminary combustion chamber, a second and larger main combustion chamber with a rearwardly open discharge nozzle, a reduced connecting portion between said two chambers, means to spray combustion liquids into said first chamber along intersecting paths, and means to ignite said mixed combustion elements in said first chamber, that improvement which comprises forming said reduced connecting portion as a member having a plurality of non-axial passages connecting the two combustion chambers and each connecting passage having successive outwardly and inwardly curved portions and delivering combustion fluids and gases from the first combustion chamber to the second combustion chamber along a plurality of separate but converging and intersecting paths, whereby further effective intermingling of the combustion elements is achieved.

ESTHER C. GODDARD,

*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,372,121 | Davis | Mar. 22, 1921 |
| 1,828,784 | Perrin | Oct. 27, 1931 |
| 1,879,186 | Goddard | Sept. 27, 1932 |
| 2,396,567 | Goddard | Mar. 12, 1946 |
| 2,408,111 | Truax et al. | Sept. 24, 1946 |

FOREIGN PATENTS

| Number | Country | Date |
|---|---|---|
| 7,701 | Great Britain | Apr. 7, 1908 |
| 254,966 | Great Britain | July 15, 1926 |
| 522,163 | France | Mar. 22, 1921 |